United States Patent
Sun et al.

(10) Patent No.: US 7,672,285 B2
(45) Date of Patent: *Mar. 2, 2010

(54) METHOD AND APPARATUS FOR MINIMIZING CO-CHANNEL INTERFERENCE BY SCRAMBLING

(75) Inventors: Feng-Wen Sun, Germantown, MD (US); Lakshmi Iyer, Germantown, MD (US)

(73) Assignee: DTVG Licensing, Inc., El Segundo, CA (US)

( * ) Notice: Subject to any disclaimer, the term of this patent is extended or adjusted under 35 U.S.C. 154(b) by 1375 days.

This patent is subject to a terminal disclaimer.

(21) Appl. No.: 11/009,333

(22) Filed: Dec. 10, 2004

(65) Prior Publication Data

US 2005/0286405 A1      Dec. 29, 2005

Related U.S. Application Data

(60) Provisional application No. 60/583,410, filed on Jun. 28, 2004, provisional application No. 60/585,654, filed on Jul. 6, 2004.

(51) Int. Cl.
*H04B 7/216* (2006.01)

(52) U.S. Cl. ............ 370/342; 375/285; 375/260; 375/296

(58) Field of Classification Search ............ None
See application file for complete search history.

(56) References Cited

U.S. PATENT DOCUMENTS

| | | | |
|---|---|---|---|
| 5,235,619 A | 8/1993 | Beyers, II et al. | |
| 5,321,754 A | 6/1994 | Fisher et al. | |
| 5,327,455 A | 7/1994 | De Gaudenzi et al. | |
| 5,377,183 A | 12/1994 | Dent | |
| 5,506,903 A | 4/1996 | Yamashita | |
| 5,710,797 A | 1/1998 | Segal et al. | |
| 5,838,740 A | 11/1998 | Kallman et al. | |
| 6,144,711 A | 11/2000 | Raleigh et al. | |
| 6,154,454 A | 11/2000 | Abe | |
| 6,201,499 B1 | 3/2001 | Hawkes et al. | |
| 6,201,798 B1 | 3/2001 | Campanella et al. | |
| 6,304,618 B1 | 10/2001 | Hafeez et al. | |
| 6,324,159 B1 * | 11/2001 | Mennekens et al. | ......... 370/203 |
| 6,400,761 B1 | 6/2002 | Smee et al. | |
| 6,452,991 B1 | 9/2002 | Zak | |
| 6,549,782 B2 | 4/2003 | Roy | |
| 6,574,235 B1 | 6/2003 | Arslan et al. | |

(Continued)

FOREIGN PATENT DOCUMENTS

CN     1728622     2/2006

(Continued)

OTHER PUBLICATIONS

Written Opinion of the International Searching Authority in International Application No. PCT/US05/12280, U.S. Appl. No. 11/103,307, filed Apr. 11, 2005.

(Continued)

*Primary Examiner*—Michael J Moore, Jr.

(57) ABSTRACT

An approach is provided for minimizing co-channel interference in a communication system is disclosed. Non-header portions of frames, which are transmitted over the communication system, are scrambled according to respective different scrambling sequences. The above arrangement is particularly suited to a digital satellite broadcast and interactive system.

24 Claims, 11 Drawing Sheets

U.S. PATENT DOCUMENTS

| | | | |
|---|---|---|---|
| 6,618,367 | B1 | 9/2003 | Riazi et al. |
| 6,707,916 | B1 | 3/2004 | Caso et al. |
| 6,853,633 | B1 | 2/2005 | Ramesh |
| 6,917,861 | B2 | 7/2005 | Klu |
| 7,002,900 | B2* | 2/2006 | Walton et al. ............... 370/208 |
| 7,016,319 | B2 | 3/2006 | Baum et al. |
| 7,031,350 | B2 | 4/2006 | Martini et al. |
| 7,039,024 | B2* | 5/2006 | Nefedov .................... 370/314 |
| 7,154,846 | B2* | 12/2006 | Chen et al. ................. 370/209 |
| 7,161,988 | B2* | 1/2007 | Lee et al. .................... 375/285 |
| 7,177,598 | B2 | 2/2007 | Klein et al. |
| 7,248,841 | B2 | 7/2007 | Agee et al. |
| 7,292,606 | B2 | 11/2007 | Li |
| 7,430,257 | B1 | 9/2008 | Shattil |
| 2001/0055319 | A1 | 12/2001 | Quigley et al. |
| 2002/0041635 | A1 | 4/2002 | Ma et al. |
| 2002/0042899 | A1 | 4/2002 | Tzannes et al. |
| 2002/0044614 | A1 | 4/2002 | Molnar et al. |
| 2002/0058513 | A1 | 5/2002 | Klein et al. |
| 2002/0154620 | A1 | 10/2002 | Azencot et al. |
| 2002/0172264 | A1 | 11/2002 | Wiberg et al. |
| 2003/0185174 | A1 | 10/2003 | Currivan et al. |
| 2004/0131025 | A1 | 7/2004 | Dohler et al. |
| 2004/0136455 | A1 | 7/2004 | Akhter et al. |
| 2004/0153942 | A1 | 8/2004 | Shtutman et al. |
| 2004/0161031 | A1 | 8/2004 | Kwentus et al. |
| 2004/0244059 | A1 | 12/2004 | Coman |
| 2004/0255229 | A1 | 12/2004 | Shen et al. |
| 2005/0226414 | A1 | 10/2005 | Lee et al. |
| 2005/0226418 | A1 | 10/2005 | Lee et al. |
| 2005/0229230 | A1 | 10/2005 | Santoru et al. |
| 2006/0227894 | A1 | 10/2006 | Lee et al. |
| 2007/0025299 | A1 | 2/2007 | Scharf et al. |

FOREIGN PATENT DOCUMENTS

| | | |
|---|---|---|
| EP | 1037401 A2 | 9/2000 |
| EP | 1037481 | 9/2000 |
| EP | 1063791 A2 | 12/2000 |
| JP | 3144780 B2 | 3/2001 |
| JP | 2001-237752 | 8/2001 |
| JP | 2002335191 | 11/2002 |
| JP | 2003-339030 | 11/2003 |
| WO | 97/01256 A1 | 1/1997 |
| WO | WO 98/49857 | 11/1998 |
| WO | WO 00/27049 | 5/2000 |
| WO | WO 01/05050 | 1/2001 |
| WO | 03/099577 A2 | 9/2003 |
| WO | 03092212 | 11/2003 |
| WO | WO 03/094520 | 11/2003 |
| WO | 2007022627 A1 | 3/2007 |

OTHER PUBLICATIONS

Written Opinion of the International Searching Authority in International Application No. PCT/US05/12279, U.S. Appl. No. 11/102,983, filed Apr. 11, 2005.

Written Opinion of the International Searching Authority in International Application No. PCT/US05/12278, U.S. Appl. No. 11/102,958, filed Apr. 11, 2005.

Written Opinion of the International Searching Authority in International Application No. PCT/US05/18564, U.S. Appl. No. 11/009,333, filed Dec. 10, 2004.

Written Opinion of the International Searching Authority in International Application No. PCT/US05/12424, U.S. Appl. No. 11/009,346, filed Dec. 10, 2004.

EPO Communication dated Nov. 15, 2007 in counterpart European patent application No. 05735282.5 in related U.S. Appl. No. 11/102,958, filed Apr. 11, 2005.

U.S. Appl. No. 11/102,983, filed Apr. 11, 2005, Joseph Santoru, Notice of Allowance dated Jan. 14, 2008.

Naguleswaran, S., Rice, M., Schroeder, J.E.; "Channel Compensation Techniques in a Receiver with Adaptive MAI Suppressions"; 2002; IEEE (0-7803-7576-9/02); entire document; http://ieeexplore.ieee.org/iel5/8521/26928/01197156.pdf.

Korean Office Communication dated Oct. 29, 2007 in Korean counterpart application No. 10-2006-7023650 of U.S. Appl. No. 11/102,983, filed Apr. 11, 2005.

Non-final Office Action dated Mar. 27, 2008 in U.S. Appl. No. 11/102,958, filed Apr. 11, 2005 by Lin-Nan Lee et al.

Non-final Office Action dated Aug. 20, 2007 in U.S. Appl. No. 11/103,307, filed Apr. 11, 2005 by Lin-Nan Lee et al.

Notice of Allowance dated Mar. 8, 2006 in U.S. Appl. No. 11/009,346, filed Dec. 10, 2004 by Lin-Nan Lee et al., now issued Jan. 9, 2007 as US Patent No. 7,161,988.

Non-final Office Action dated Nov. 14, 2005 in U.S. Appl. No. 11/009,346, filed Dec. 10, 2004 by Lin-Nan Lee et al., now issued Jan. 9, 2007 as US Patent No. 7,161,988.

Non-final Office Action dated Mar. 18, 2008 in U.S. Appl. No. 11/449,912, filed Jun. 9, 2006 by Lin-Nan Lee et al.

Korean Office Action dated Mar. 28, 2008 in Korean counterpart Application No. 10-2007-7002090 corresponding to U.S. Appl. No. 11/009,333, filed Dec. 10, 2004 by Feng-Wen Sun et al.

Ponnampalam, Vishakan and Jones, Alan E.; "On Cell Parameter ID Assignment in Utra-TDD"; Personal, Indoor and Mobile Radio Communications; 2004; PIMRC 2004; 15th IEEE International Symposium; Barcelona, Spain; Sep. 5-8, 2004; Piscataway, New Jersey USA; vol. 3; pp. 2051-2054; XP010754293; ISBN: 0-7803-8523-3; Section III and Section IV.

Al-Meshhadany, Thamer and Al Agha, Khaldoun; "Analysis of the Code Allocation Mechanism in the WCDMA"; Mobile and Wireless Communications Network; 2002; 4th International Workshop; Sep. 9-11, 2002; Piscataway, New Jersey USA; pp. 196-199; XP010611845; ISBN: 0-7803-7605-6; pp. 196-197.

Notice of Allowance dated Feb. 13, 2008 in U.S. Appl. No. 11/103,307, filed Apr. 11, 2005 by Lin-Nan Lee et al.

Chinese Office Action dated Aug. 15, 2008 in Chinese counterpart Application No. 200580018562.8 corresponding to U.S. Appl. No. 11/102,958, filed Apr. 11, 2005 by Lin-Nan Lee et al.

Notice of Allowance dated Sep. 30, 2008 in U.S. Appl. No. 11/102,958, filed Apr. 11, 2005 by Lin-Nan Lee et al.

Chinese Office Action dated Nov. 14, 2008 in Chinese Patent Application No. 200580017076.4 filed Apr. 11, 2005 by Lin-Nan Lee et al.

Non-final Office Action dated Mar. 13, 2009 in U.S. Appl. No. 11/449,912, filed Jun. 9, 2006 by Lin-Nan Lee et al.

EPO Communication dated Jul. 23, 2009 in European Patent Application No. 05735282.5 filed Apr. 11, 2005 by Lin-Nan Lee et al.

Canadian Office Action dated Sep. 2, 2009 in Canadian Patent Application No. 2,562,549 filed Apr. 11, 2005 by Lin-Nan Lee et al; 4 pages.

Chinese Office Action dated Sep. 4, 2009 in Chinese Patent Application No. 200580026710.0 filed May 26, 2005 by Feng-Wen Sun et al.; 6 pages.

ETSI; "Digital Video Broadcasting (DVB); Second Generation Framing Structure, Channel Coding and Modulation Systems for Broadcasting, Interactive Services, News Gathering and Other Broadband Satellite Applications"; Draft ETS EN 302 307 V1.1.1; Jun. 1, 2004; ETSI Standards; Lis, Sophia Antipolis Cedex, France; vol. BC, No. V1.1.1; XP014015373; ISSN: 0000-0001.

Supplementary European search report dated Apr. 28, 2009 in European patent Application No. 05753920.7 filed May 26, 2005 by Feng-Wen Sun et al.

Non-final OfficeAction dated Oct. 1, 2009 in U.S. Appl. No. 11/449,912, filed Jun. 9, 2006 by Lin-Nan Lee et al.

Japanese Office Action dated Sep. 15, 2009 in Japanese Patent Application No. 2007-508446 filed Apr. 11, 2005 by Lin-Nan Lee et al.

Japanese Office Action dated Sep. 15, 2009 in Japanese Patent Application No. 2007-508448 filed Apr. 11, 2005 by Lin-Nan Lee et al.

Japanese Office Action dated Sep. 15, 2009 in Japanese Patent Application No. 2007-508476 filed Apr. 11, 2005 by Lin-Nan Lee et al.

Japanese Office action dated Sep. 29, 2009 in Japanese Patent Application No. 2007-519222 filed May 26, 2005 by Feng-Wen Sun et al.

* cited by examiner

FIG. 10

| Seq. #(n) | 0 | 189063 | 153751 | 238776 | 62994 | 95552 | 2553 | 227369 | 26392 | 214455 | 51921 | 208647 | 27314 | 104754 | 76683 | 146239 | 96364 |
|---|---|---|---|---|---|---|---|---|---|---|---|---|---|---|---|---|---|
| 0 | 0.00 | -3.65 | -3.48 | -3.45 | -3.49 | -3.57 | -3.45 | -3.49 | -3.23 | -2.98 | -3.49 | -3.14 | -3.00 | -3.00 | -3.57 | -3.32 | -3.19 |
| 189063 | -3.65 | 0.00 | -3.14 | -3.45 | -2.98 | -3.32 | -3.45 | -3.52 | -3.49 | -3.39 | -3.57 | -3.26 | -3.25 | -3.39 | -3.00 | -3.57 | -3.08 |
| 153751 | -3.48 | -3.14 | 0.00 | -3.13 | -3.14 | -3.00 | -3.24 | -3.73 | -3.19 | -3.19 | -3.62 | -3.37 | -2.92 | -3.48 | -3.09 | -3.14 | -3.32 |
| 238776 | -3.45 | -3.45 | -3.13 | 0.00 | -3.23 | -2.85 | -3.14 | -3.14 | -3.06 | -3.24 | -3.23 | -3.65 | -2.92 | -2.91 | -3.13 | -3.25 | -2.87 |
| 62994 | -3.49 | -2.98 | -3.14 | -3.23 | 0.00 | -3.14 | -3.37 | -2.92 | -3.72 | -3.00 | -3.24 | -3.41 | -3.37 | -3.01 | -2.78 | -3.25 | -3.27 |
| 95552 | -3.57 | -3.32 | -3.00 | -2.85 | -3.14 | 0.00 | -3.23 | -3.09 | -2.92 | -3.32 | -3.62 | -3.57 | -3.57 | -3.14 | -3.06 | -3.00 | -3.13 |
| 2553 | -3.45 | -3.45 | -3.24 | -3.14 | -3.14 | -3.23 | 0.00 | -3.00 | -3.00 | -3.65 | -3.45 | -3.26 | -3.09 | -3.63 | -3.45 | -3.26 | -3.25 |
| 227369 | -3.49 | -3.52 | -3.73 | -3.14 | -2.92 | -3.09 | -3.00 | 0.00 | -3.26 | -2.91 | -2.82 | -3.21 | -3.25 | -3.21 | -3.00 | -3.00 | -3.00 |
| 26392 | -3.23 | -3.49 | -3.19 | -3.06 | -3.72 | -2.92 | -3.00 | -3.26 | 0.00 | -3.45 | -3.57 | -3.19 | -3.37 | -3.14 | -3.57 | -3.32 | -3.39 |
| 214455 | -2.98 | -3.39 | -3.19 | -3.24 | -3.00 | -3.32 | -3.65 | -2.91 | -3.45 | 0.00 | -3.32 | -3.27 | -3.45 | -3.39 | -3.45 | -3.65 | -3.08 |
| 51921 | -3.49 | -3.57 | -3.62 | -3.23 | -3.24 | -3.62 | -3.45 | -2.82 | -3.57 | -3.32 | 0.00 | -3.35 | -3.37 | -3.24 | -3.09 | -3.26 | -3.01 |
| 208647 | -3.14 | -3.26 | -3.37 | -3.65 | -3.41 | -3.57 | -3.26 | -3.21 | -3.19 | -3.27 | -3.35 | 0.00 | -3.08 | -3.52 | -3.45 | -3.63 | -3.25 |
| 27314 | -3.00 | -3.25 | -2.92 | -2.92 | -3.37 | -3.57 | -3.09 | -3.25 | -3.37 | -3.45 | -3.37 | -3.08 | 0.00 | -2.92 | -3.39 | -2.98 | -3.24 |
| 104754 | -3.00 | -3.39 | -3.48 | -2.91 | -3.01 | -3.14 | -3.63 | -3.21 | -3.14 | -3.39 | -3.24 | -3.52 | -2.92 | 0.00 | -3.37 | -2.91 | -3.14 |
| 76683 | -3.57 | -3.00 | -3.09 | -3.13 | -2.78 | -3.06 | -3.45 | -3.00 | -3.57 | -3.45 | -3.09 | -3.45 | -3.39 | -3.37 | 0.00 | -3.35 | -3.65 |
| 146239 | -3.32 | -3.57 | -3.14 | -3.25 | -3.25 | -3.00 | -3.26 | -3.00 | -3.32 | -3.65 | -3.26 | -3.63 | -2.98 | -2.91 | -3.35 | 0.00 | -2.95 |
| 96364 | -3.19 | -3.08 | -3.32 | -2.87 | -3.27 | -3.13 | -3.25 | -3.00 | -3.39 | -3.08 | -3.01 | -3.25 | -3.24 | -3.14 | -3.65 | -2.95 | 0.00 |

FIG. 11

| Seed | 13 | 53 | 70 | 74 | 126 | 159 | 179 | 216 | 236 | 238 | 244 | 262 | 278 | 536 | 628 | 737 | 771 |
|---|---|---|---|---|---|---|---|---|---|---|---|---|---|---|---|---|---|
| 13 | 0.00 | -3.37 | -3.21 | -3.37 | -3.26 | -3.24 | -3.14 | -3.23 | -3.63 | -3.48 | -3.14 | -3.52 | -3.14 | -3.23 | -3.41 | -3.39 | -3.37 |
| 53 | -3.37 | 0.00 | -3.06 | -3.13 | -3.25 | -3.27 | -3.49 | -3.51 | -3.62 | -3.57 | -3.24 | -3.04 | -3.26 | -3.25 | -3.49 | -3.63 | -3.24 |
| 70 | -3.21 | -3.06 | 0.00 | -3.74 | -3.26 | -3.25 | -3.19 | -3.49 | -3.84 | -3.35 | -3.27 | -3.25 | -3.26 | -3.39 | -3.45 | -3.00 | -3.51 |
| 74 | -3.37 | -3.13 | -3.74 | 0.00 | -3.37 | -3.00 | -3.25 | -3.14 | -3.26 | -3.45 | -3.57 | -3.37 | -3.04 | -3.37 | -3.26 | -3.04 | -3.65 |
| 126 | -3.26 | -3.25 | -3.26 | -3.37 | 0.00 | -3.26 | -3.49 | -3.09 | -3.08 | -3.48 | -3.26 | -3.14 | -3.26 | -3.32 | -3.49 | -3.49 | -3.19 |
| 159 | -3.24 | -3.27 | -3.25 | -3.00 | -3.26 | 0.00 | -3.24 | -3.09 | -3.23 | -3.00 | -3.45 | -3.21 | -3.23 | -3.39 | -3.32 | -3.24 | -3.48 |
| 179 | -3.14 | -3.49 | -3.19 | -3.25 | -3.49 | -3.24 | 0.00 | -2.92 | -3.49 | -3.25 | -3.01 | -3.14 | -3.49 | -3.49 | -3.14 | -3.41 | -3.39 |
| 216 | -3.23 | -3.51 | -3.49 | -3.14 | -3.09 | -3.09 | -2.92 | 0.00 | -3.32 | -3.49 | -3.00 | -3.48 | -3.32 | -3.51 | -3.45 | -3.49 | -3.25 |
| 236 | -3.63 | -3.62 | -3.84 | -3.26 | -3.08 | -3.23 | -3.49 | -3.32 | 0.00 | -3.25 | -3.04 | -3.48 | -3.24 | -3.45 | -2.92 | -3.57 | -3.26 |
| 238 | -3.48 | -3.57 | -3.35 | -3.45 | -3.48 | -3.00 | -3.25 | -3.49 | -3.25 | 0.00 | -3.00 | -3.48 | -3.26 | -3.39 | -3.35 | -3.49 | -3.45 |
| 244 | -3.14 | -3.24 | -3.27 | -3.57 | -3.26 | -3.45 | -3.01 | -3.00 | -3.04 | -3.00 | 0.00 | -3.09 | -3.13 | -3.39 | -3.26 | -3.27 | -2.95 |
| 262 | -3.52 | -3.04 | -3.25 | -3.37 | -3.14 | -3.21 | -3.14 | -3.48 | -3.48 | -3.48 | -3.09 | 0.00 | -3.08 | -3.00 | -3.74 | -3.57 | -3.19 |
| 278 | -3.14 | -3.26 | -3.26 | -3.04 | -3.26 | -3.23 | -3.49 | -3.32 | -3.24 | -3.26 | -3.13 | -3.08 | 0.00 | -3.63 | -3.26 | -3.14 | -3.35 |
| 536 | -3.23 | -3.25 | -3.39 | -3.37 | -3.32 | -3.39 | -3.49 | -3.51 | -3.45 | -3.39 | -3.39 | -3.00 | -3.63 | 0.00 | -3.51 | -3.19 | -3.14 |
| 628 | -3.41 | -3.49 | -3.45 | -3.26 | -3.49 | -3.32 | -3.14 | -3.45 | -2.92 | -3.35 | -3.26 | -3.74 | -3.26 | -3.51 | 0.00 | -3.52 | -3.26 |
| 737 | -3.39 | -3.63 | -3.00 | -3.04 | -3.49 | -3.24 | -3.41 | -3.49 | -3.57 | -3.49 | -3.27 | -3.57 | -3.14 | -3.19 | -3.52 | 0.00 | -3.26 |
| 771 | -3.37 | -3.24 | -3.51 | -3.65 | -3.19 | -3.48 | -3.39 | -3.25 | -3.26 | -3.45 | -2.95 | -3.19 | -3.35 | -3.14 | -3.26 | -3.26 | 0.00 |

METHOD AND APPARATUS FOR MINIMIZING CO-CHANNEL INTERFERENCE BY SCRAMBLING

RELATED APPLICATIONS

This application claims the benefit of the earlier filing date under 35 U.S.C. § 119(e) of U.S. Provisional Application Ser. No. 60/583,410 filed Jun. 28, 2004, entitled "Scrabling of Physical Layer Header and Pilot Symbol in DVB-S2 to Reduce Co-Channel Interference," and U.S. Provisional Application Ser. No. 60/585,654 filed Jul. 6, 2004, entitled "Scrambling of Physical Layer Header and Pilot Symbol in DVB-S2 to Reduce Co-Channel Interference"; the entireties of which are incorporated herein by reference.

FIELD OF THE INVENTION

The present invention relates to communication systems, and more particularly to combating signal interference.

BACKGROUND OF THE INVENTION

Broadcast systems have embraced the demand for high quality transmissions made possible by digital technology. The digital revolution has transformed the delivery of broadband services, including audio and video programming as well as data transmission. Satellite communication systems have emerged as a viable solution for supporting such broadband services. As such, power and bandwidth efficient modulation and coding are highly desirable for satellite communications systems to provide reliable communication across noisy communication channels. Receiver performance is negatively impacted by co-channel interference. Such interference occurs largely from frequency-reuse, as spectral allocation of frequencies is finite and expensive. In practical applications, the co-channel interference may stem from transmission of other system operators, a satellite operating in adjacent orbital slots, or other spot beams in a spot beam satellite system.

Traditionally, the negative effects of co-channel interference have been minimized by redesigning the frequency assignments or altering (by upgrading) the transmission facilities to confine the spreading of the signals. These approaches require significant engineering investments (assuming that a technical solution is even possible); this necessarily entails significant costs.

Therefore, there is a need for a communication system that minimizes co-channel interference without requiring substantial system redesign.

SUMMARY OF THE INVENTION

These and other needs are addressed by the present invention, wherein an approach is provided for minimizing co-channel interference in a digital broadcast and interactive system. It is recognized that the cross-correlations between co-channel frames are periodic in nature. Each of these frames includes a header and a pilot sequence for synchronization of carrier phase and carrier frequency. Non-header portions of the frames are scrambled according to respective different scrambling sequences to minimize interference between the co-channels. According to one embodiment of the present invention, different initialization seeds are supplied to a Gold sequence generator for each of the co-channels to produce the different scrambling sequences. The above arrangement advantageously reduces the impact of co-channel interference, thereby enhancing receiver performance.

According to one aspect of an embodiment of the present invention, a method for minimizing co-channel interference in a communication system is disclosed. The method includes assigning a first scrambling sequence, associated with a header or a pilot sequence of a first frame, to a first co-channel. The method also includes assigning a second scrambling sequence, associated with a header or a pilot sequence of a second frame, to a second co-channel that is adjacent to the first co-channel. The non-header portions of the frames are scrambled according to the respective different scrambling sequences.

According to another aspect of an embodiment of the present invention, an apparatus for minimizing co-channel interference in a communication system is disclosed. The apparatus includes a scrambler configured to assign a first scrambling sequence, associated with a header or a pilot sequence of a first frame, to a first co-channel. The scrambler assigns a second scrambling sequence, associated with a header or a pilot sequence of a second frame, to a second co-channel that is adjacent to the first co-channel. The non-header portions of the frames are scrambled according to the respective scrambling sequences.

According to another aspect of an embodiment of the present invention, a method for communicating in a radio communication system is disclosed. The method includes transmitting a plurality of frames over different communication channels established over the radio communication system. The communication channels are adjacent co-channels. Each of the frames includes a header and a pilot sequence for synchronization of carrier phase and carrier frequency, and non-header portions of the frames are scrambled according to respective different scrambling sequences to minimize interference between the co-channels.

According to another aspect of an embodiment of the present invention, an apparatus for communicating in a radio communication system is disclosed. The apparatus includes a transmitter configured to transmit a plurality of frames over different communication channels established over the radio communication system, wherein the communication channels are adjacent co-channels. Each of the frames includes a header and a pilot sequence for synchronization of carrier phase and carrier frequency, and non-header portions of the frames are scrambled according to respective different scrambling sequences to minimize interference between the co-channels.

According to another aspect of an embodiment of the present invention, method for communicating in a radio communication system is disclosed. The method includes receiving a plurality of frames over different communication channels established over the radio communication system. The communication channels are adjacent co-channels. Each of the frames includes a header and a pilot sequence for synchronization of carrier phase and carrier frequency, and non-header portions of the frames are scrambled according to respective different scrambling sequences to minimize interference between the co-channels.

According to yet another aspect of an embodiment of the present invention, an apparatus for communicating in a radio communication system is disclosed. The apparatus includes a receiver configured to receive a plurality of frames over different communication channels established over the radio communication system, wherein the communication channels are adjacent co-channels. Each of the frames includes a header and a pilot sequence for synchronization of carrier phase and carrier frequency, and non-header portions of the frames are scrambled according to respective different scrambling sequences to minimize interference between the co-channels.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 10 and 11 are tables showing the worst-case cross-correlations of pilot-segments for each pair of co-channels for determining the initialization seeds of the m-generator of FIG. 7.

DESCRIPTION OF THE PREFERRED EMBODIMENT

An apparatus, method, and software for reducing co-channel interference in a digital broadcast and interactive system are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
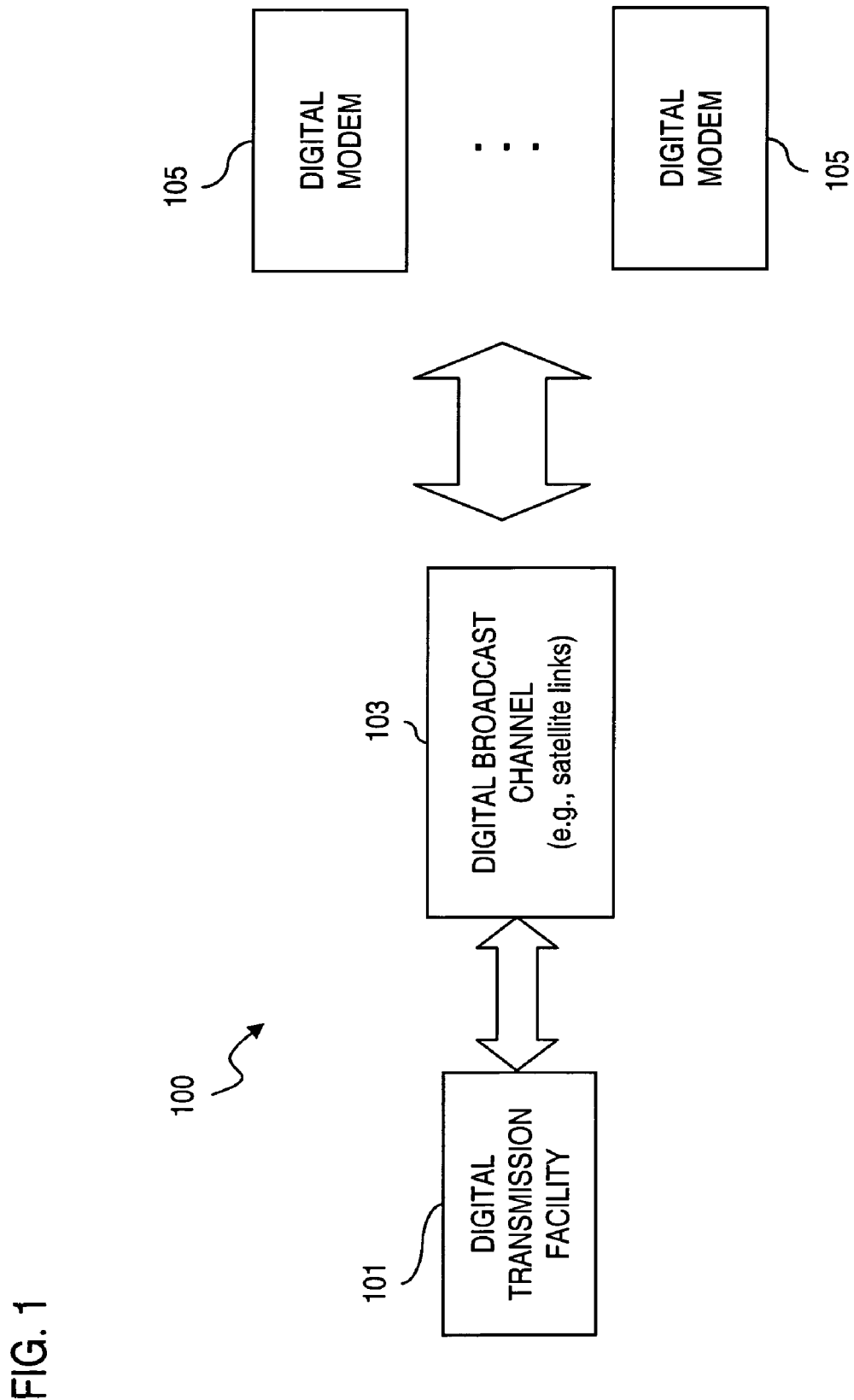
FIG. 1 is a diagram of a digital broadcast system capable of minimizing co-channel interference, according to an embodiment of the present invention.

FIG. 1 is a diagram of a digital broadcast system capable of minimizing co-channel interference, according to an embodiment of the present invention. The digital communications system 100 includes a digital transmission facility 101 that generates signal waveforms for broadcast across a communication channel 103 to one or more digital modems 105. According to one embodiment of the present invention, the communication system 100 is a satellite communication system that supports, for example, audio and video broadcast services as well as interactive services. Interactive services include, for example, electronic programming guides (EPGs), high-speed internet access, interactive advertising, telephony, and email services. These interactive services can also encompass such television services as Pay Per View, TV Commerce, Video On Demand, Near Video On Demand and Audio On Demand services. In this environment, the modems 105 are satellite modems.

In broadcast applications, continuous mode modems 105 are widely used. Codes that perform well in low signal-to-noise (SNR) environments are at odds with these modems with respect to synchronization (e.g., carrier phase and carrier frequency). Physical layer header and/or pilot symbols can be used for such synchronization. Accordingly, an important consideration with respect to system performance is that of co-channel interference on physical layer header and/or pilot symbols. Because physical layer header and/or pilots are used for acquiring and/or tracking carrier phase, carrier frequency, such interference can degrade receiver performance.

Conventional digital broadcast systems (not shown) require use of additional training symbols beyond that of the normal overhead bits in a frame structure for their synchronization processes. The increase in overhead is particularly required when the Signal-to-Noise (SNR) is low; such an environment is typical when high performance codes are used conjunction with high order modulation. Traditionally, continuous mode modems utilize a feedback control loop to acquire and track carrier frequency and phase. In this synchronization process, the FEC (Forward Error Correction) coded data fields, e.g., preambles of a block code, which contain known data symbols, are simply ignored. Such conventional approaches that are purely based on feedback control loops are prone to strong Radio Frequency (RF) phase noise and thermal noise, causing high cycle slip rates and an error floor on the overall receiver performance. Thus these approaches are burdened by increased overhead in terms of training symbols for certain performance target, in addition to limited acquisition range and long acquisition time. Further, these conventional synchronization techniques are dependent on the particular modulation scheme, thereby hindering flexibility in use of modulation schemes.

In the system 100 of FIG. 1, the modems 105 achieve carrier synchronization by examining the preambles and/or unique words (UW) that are embedded in broadcast data frame structures (shown in FIG. 4), thereby reducing the use of additional overhead specifically designated for training purposes. The digital modems 105 are more fully described below with respect to FIG. 3.

In this discrete communications system 100, the transmission facility 101 produces a discrete set of possible messages representing media content (e.g., audio, video, textual information, data, etc.); each of the possible messages has a corresponding signal waveform. These signal waveforms are attenuated, or otherwise altered, by communications channel 103. To combat the noise channel 103, the transmission facility 101 utilizes Low Density Parity Check (LDPC) codes.

The LDPC codes that are generated by the transmission facility 101 enable high speed implementation without incurring any performance loss. These structured LDPC codes output from the transmission facility 101 avoid assignment of a small number of check nodes to the bit nodes already vulnerable to channel errors by virtue of the modulation scheme (e.g., 8PSK). Such LDPC codes have a parallelizable decoding process (unlike turbo codes), which advantageously involves simple operations such as addition, comparison and table look-up. Moreover, carefully designed LDPC codes do not exhibit any sign of error floor.

According to one embodiment of the present invention, the transmission facility 101 generates, using a relatively simple encoding technique as explained below in FIG. 2, LDPC codes based on parity check matrices (which facilitate efficient memory access during decoding) to communicate with the satellite modem 105.

Figure 2:
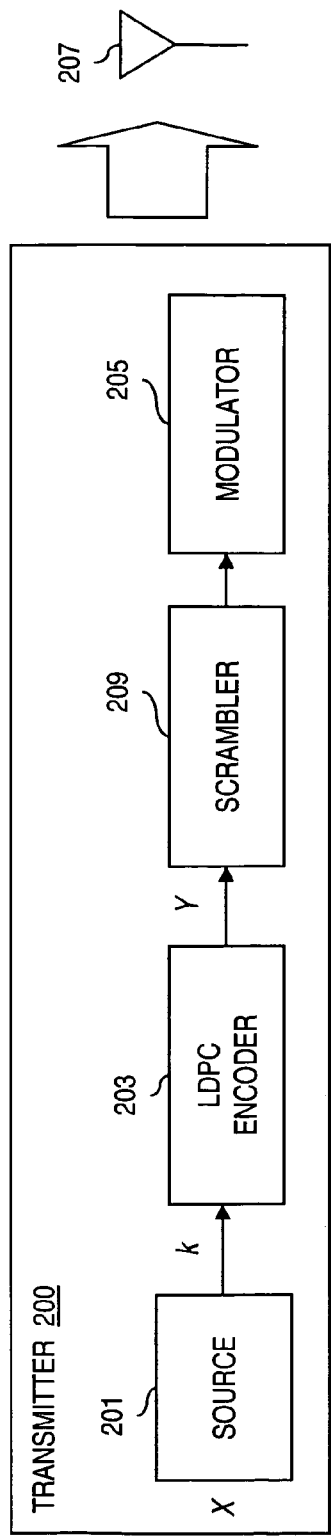
FIG. 2 is a diagram of an exemplary transmitter employed in the digital transmission facility of the system of FIG. 1.

FIG. 2 is a diagram of an exemplary transmitter employed in the digital transmission facility of the system of FIG. 1. A transmitter 200 is equipped with an LDPC encoder 203 that accepts input from an information source 201 and outputs coded stream of higher redundancy suitable for error correction processing at the receiver 105. The information source 201 generates k signals from a discrete alphabet, X. LDPC codes are specified with parity check matrices. On the other hand, encoding LDPC codes require, in general, specifying the generator matrices. Even though it is possible to obtain generator matrices from parity check matrices using Gaussian elimination, the resulting matrix is no longer sparse and storing a large generator matrix can be complex.

Encoder 203 generates signals from alphabet Y to a modulator 205 using a simple encoding technique that makes use of only the parity check matrix by imposing structure onto the parity check matrix. Specifically, a restriction is placed on the parity check matrix by constraining certain portion of the matrix to be triangular. Such a restriction results in negligible performance loss, and therefore, constitutes an attractive trade-off. The construction of such a parity check matrix is described more fully described in a co-pending patent application filed Jul. 3, 2003, and entitled, "Method and System for Providing Low Density Parity Check (LDPC) Encoding" (Ser. No. 10/613,823); the entirety of which is incorporated herein by reference.

Modulator 205 maps the encoded messages from encoder 203 to signal waveforms that are transmitted to a transmit antenna 207, which emits these waveforms over the communication channel 103. Accordingly, the encoded messages are modulated and distributed to a transmit antenna 207. The transmissions from the transmit antenna 207 propagate to a digital modem, as discussed below. In the case of a satellite communication system, the transmitted signals from the antenna 207 are relayed via a satellite. The transmitter 200 further includes a scrambler 209 for altering symbols for transmission as to minimize co-channel interference, as more fully described below.

Figure 3:
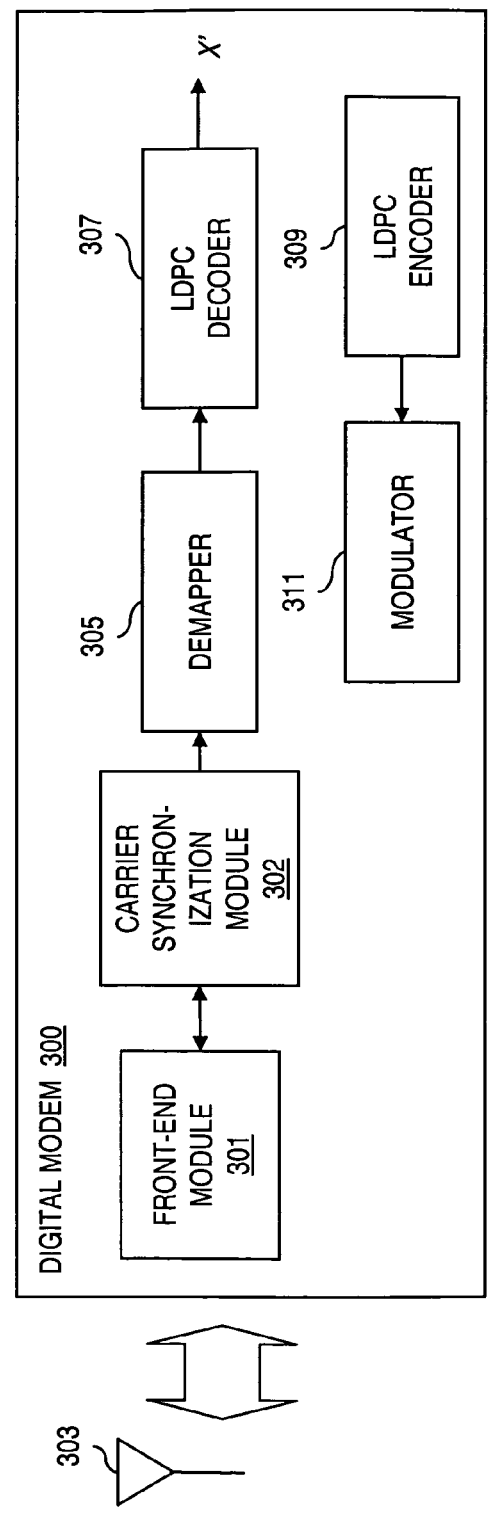
FIG. 3 is a diagram of an exemplary digital modem in the system of FIG. 1.

FIG. 3 is a diagram of an exemplary digital modem in the system of FIG. 1. The digital modem 300, as a modulator/demodulator, supports both transmission and reception of signals from the transmitter 200. According to one embodiment of the present invention, the modem 300 has a front-end module 301 that provides filtering and symbol timing synchronization of the LDPC encoded signals received from antenna 303, a carrier synchronization module 302 that provides frequency and phase acquisition and tracking of the signals output from the front-end module 301. A demapper 305 performs demapping of received signals output from the carrier synchronization module 302. After demodulation, the signals are forwarded to a LDPC decoder 307, which attempts to reconstruct the original source messages by generating messages, X'.

On the transmission side, the modem 300 utilizes a LDPC encoder 309 to encode input signals. The encoded signals are then modulated by a modulator 311, which can employ a variety of modulation schemes—e.g., Binary Phase Shift Keying (BPSK), Quadrature Phase Shift Keying (QPSK), 8PSK, 16 Amplitude Phase Shift Keying (APSK), 32APSK, a high order Quadrature Amplitude Modulation (QAM), or other high order modulation schemes.

Figure 4:
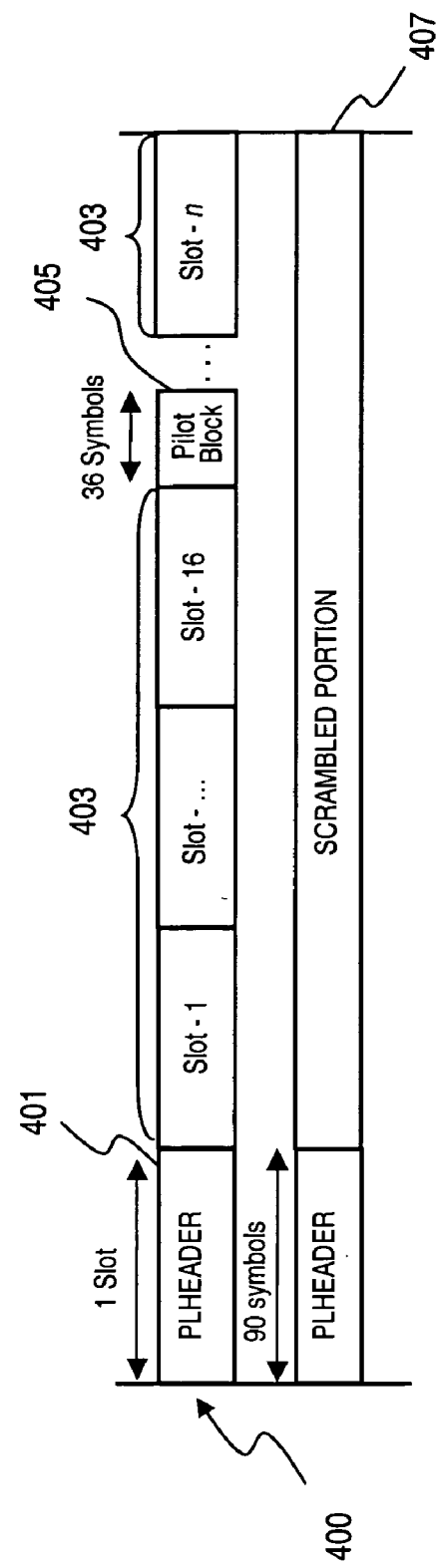
FIG. 4 is a diagram of an exemplary frame structure used in the system of FIG. 1.

FIG. 4 is a diagram of an exemplary frame structure used in the system of FIG. 1. By way of example, an LDPC coded frame 400, which can support, for example, satellite broadcasting and interactive services, is shown. The frame 400 includes a Physical Layer Header (denoted "PLHEADER") 401 and occupies one slot, as well as other slots 403 for data or other payload. In addition, the frame 400, according to one embodiment of the present invention, utilizes a pilot block 405 to aid synchronization of carrier phase and frequency. It is noted that the pilot block 405 is optional, and is inserted via a pilot insertion process. Although shown after 16 slots 403, the pilot block (or pilot sequence) 405, which represents a Unique Word (UW), can be inserted anywhere along the frame 400.

In an exemplary embodiment, the pilot insertion process inserts pilot blocks every 1440 symbols. Under this scenario, the pilot block includes 36 pilot symbols. For instance, in the physical layer frame 400, the first pilot block is thus inserted 1440 symbols after the PLHEADER, the second pilot block is inserted after 2880 symbols, and etc. If the pilot block position coincides with the beginning of the next PLHEADER, then the pilot block is not inserted. The above pilot insertion process is further detailed in co-pending application, entitled "Method and Apparatus for Providing Carrier Synchronization in Digital Broadcast and Interactive Systems" (filed May 10, 2004; Ser. No. 10/842,325); which is incorporated herein in its entirety.

The carrier synchronization module 302 (FIG. 3), according to an embodiment of the present invention, utilizes the PLHEADER 401 and/or UWs 405 for carrier frequency and phase synchronization. As previously mentioned, conventionally, the FEC coded data, which contains known data symbols (e.g., the PLHEADER 401), are ignored in continuous mode modems. That is, the PLHEADER 401 and/or UWs 405 are used for carrier synchronization, i.e., for assisting with the operation of frequency acquisition and tracking, and phase tracking loop. As such, the PLHEADER 401 and UWs 405 are considered "training" or "pilot" symbols, and constitute, individually or collectively, a training block.

For 8PSK modulation, the pilot sequence 405 is a 36-symbol long segment (with each symbol being $(1+j)/\sqrt{2}$); that is, 36 symbols (PSK). In the frame 400, the pilot sequence 405 can be inserted after 1440 symbols of data. Under this scenario, the PLHEADER 401 can have 64 possible formats depending on the modulation, coding and pilot configuration.

To mitigate the effect of co-channel interference, the non-header portion 407 of the frame 400 is scrambled. The scrambling process is further explained with respect to FIGS. 5A, 5B, 8 and 9. As used herein, the scrambled pilot sequence is also denoted as a "pilot-segment" of the frame 400. Further, although the frame 400 exhibits a structure for an 8PSK-modulated frame, when transmitting in the long-frame mode (e.g., 64800 data bits/frame), a QPSK-modulated frame can contain 22 pilot-segments.

Although the frame 400 is described with respect to a structure that supports satellite broadcasting and interactive services (and compliant with the Digital Video Broadcast (DVB)—S2 standard), it is recognized that the carrier synchronization techniques of the present invention can be applied to other frame structures.

Figure 5A:
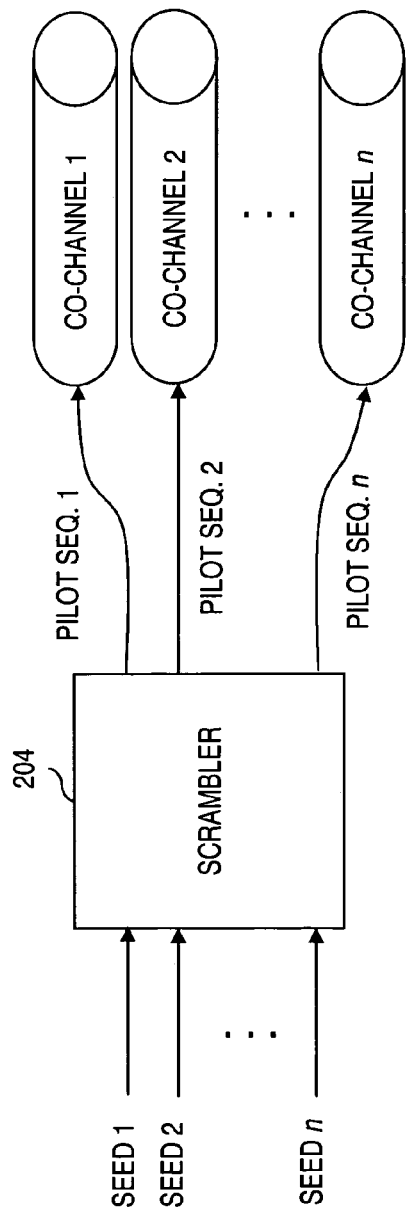
FIGS. 5A and 5B are, respectively, a diagram of a scrambler for isolating co-channel interference and a diagram of a Gold sequence generator for outputting Gold codes used to construct scrambling codes, according to various embodiments of the present invention.

FIG. 5A is a diagram of a scrambler for isolating co-channel interference, according to an embodiment of the present invention. A scrambling code is a complex sequence that can be constructed from a Gold code, according to one embodiment of the present invention. That is, a scrambler 209 generates a scrambling sequence Rn(i). Table 1 defines how the scrambling sequence Rn(i) scrambles the frame using the scrambler 209, according to the scrambler logic of FIG. 7. In particular, Table 1 shows the mapping of an input symbol to an output symbol based on the output of the scrambler 209.

TABLE 1

| Rn(i) | Input(i) | Output(i) |
|---|---|---|
| 0 | I + jQ | I + jQ |
| 1 | I + jQ | −Q + jI |
| 2 | I + jQ | −I − jQ |
| 3 | I + jQ | Q − jI |

Different Gold sequences can be generated by using different seeds for either of the two m-sequence generators. By using different seeds for different services, the mutual interference can be reduced.

In a broadcast mode, the 90 symbol physical layer header 401 can remain constant for a particular physical channel. The Gold sequence is reset at the beginning of each frame, and thus, the scrambled pilots are periodical as well with a period equal to the frame length. Because the information carrying data in a frame varies and appears to be random, the co-channel interference is random and degrades the operating signal-to-noise ratio. However, due to the nature of time-invariance of the physical layer header 401 and the pilot block 405, the carrier and phase estimation is skewed for a receiver depending on these pilots and physical layer header for such acquisition and tracking. This will degrade the performance beyond those of signal-to-noise ratio degradation associated with random data.

The scrambler 209 utilized different scrambling sequences (n in number) to further isolate the co-channel interference. Each scrambling sequence, or pilot sequence, corresponds to a different seed n. By way of example, 17 possible configurations are provided, as shown in Table 2 below. In each configuration, one scrambling sequence is provided for the physical layer header and one for the pilots. Different pilots are specified in terms of different seed of the Gold sequences.

Figure 5B:
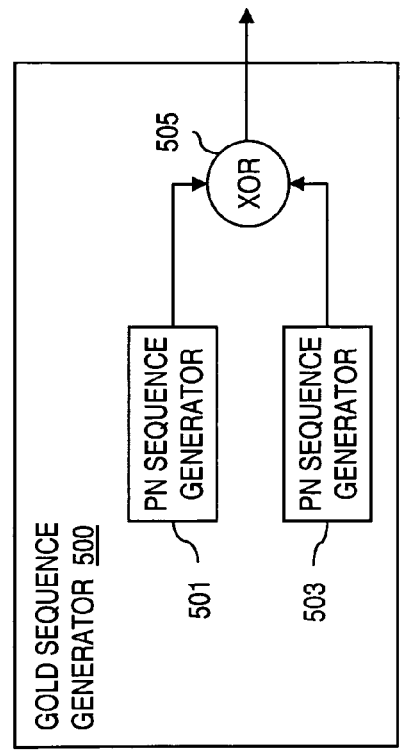
Figure 7:
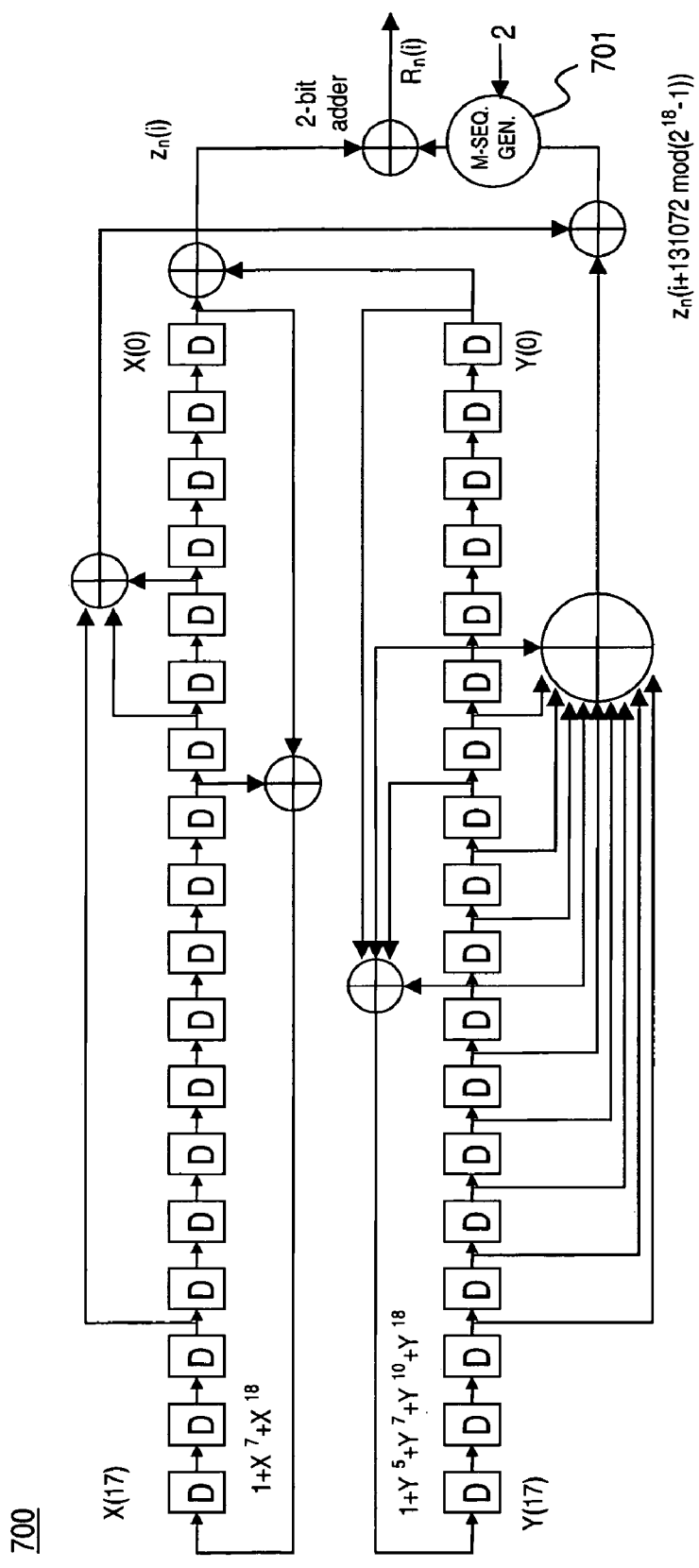
FIG. 7 is a diagram of an exemplary Gold sequence generator used in the scrambler of FIG. 6.

FIG. 5B provides a diagram of a Gold sequence generator for outputting Gold codes used to construct scrambling codes, in accordance with an embodiment of the present invention. As shown, a Gold Sequence Generator 500 employs two Pseudo-Noise (PN) Sequence Generators 501, 503 to generate a "preferred pair" of sequences. The "preferred pair" can be specified by "preferred polynomials" (as seen in the scrambler of FIG. 7). The outputs of these PN Sequence Generators 501, 503 are fed to an XOR logic 505, which performs an Exclusive-OR function on the output sequences to produce a Gold sequence. The Gold Sequence Generator 500 generates Gold sequences from a large class of sequences that exhibit good periodic cross-correlation properties. The Gold sequences are defined using a specified pair of sequences u and v, of period $N=2^n-1$; such a pair is termed a "preferred pair." The set G(u, v) of Gold sequences is defined as follows:

$$G(u,v)=\{u, v, u \oplus v, u \oplus Tv, u \oplus T^2v, \ldots, u \oplus T^{N-1}v\}, \quad \text{Eq. (1)}$$

where T represents the operator that shifts vectors cyclically to the left by one place, and $\oplus$ represents modulo 2 addition. It is noted that G(u,v) contains N+2 sequences of period N. Gold sequences have the property that the cross-correlation between any two, or between shifted versions of them, assumes one of three values: −t(n), −1, or t(n)−2, where $$t(n) = \begin{cases} 1 + 2^{(n+1)/2} & n \text{ even} \\ 1 + 2^{(n+2)/2} & n \text{ odd} \end{cases} \quad \text{Eq. (2)}$$

Turning back to the scrambler 209, in operation, different seed or physical layer sequences are used for "adjacent co-channel." The scrambling mechanism of the scrambler 209 advantageously reduces the signaling by associating one by one between the physical layer signaling and the different seeds representing different Gold sequences. Table 2 enumerates the selection of the scrambling sequence for the physical layer header, in octal format.

TABLE 2

| |
|---|
| 00000000000000000000000000000000 |
| 01744144207337236561135632153 |
| 26542635644353627667021141174 |
| 25222755446516420477163427437 |
| 77617216347710213453115572225 |
| 72367711464360032762532206306 |
| 53063022652372600361314477362 |
| 41450145732243355767243562036 |
| 43602356127375566122675140514 |
| 15276466742136146227566434753 |
| 76571613357223143642173313725 |
| 47550603300214057262124712336 |
| 43662471242327501420066030557 |
| 54640213424553440740441053630 |
| 30636504110170116551216420131 |
| 41745600023130623630525103264 |
| 41326045250636230646200035174 |

Data is assumed to be independent in the co-channels. Therefore, the co-channel interference consists only of terms corresponding to the cross-correlation between the pilot-segments of the channels. The data of one channel and pilot-segment on the other channel are also uncorrelated. Depending on the extent of overlap, the correlation may be complete or partial. The correlation $C_{XY}(n)$ of the pilot-segments x(n) and y(n) is expressed in Equation 3, where the sum is over the number of overlapping symbols.

$$C_{XY}(n) = \frac{1}{36} \sum_k x(k) y*(k-n) \quad \text{Eq. (3)}$$

Figure 6:
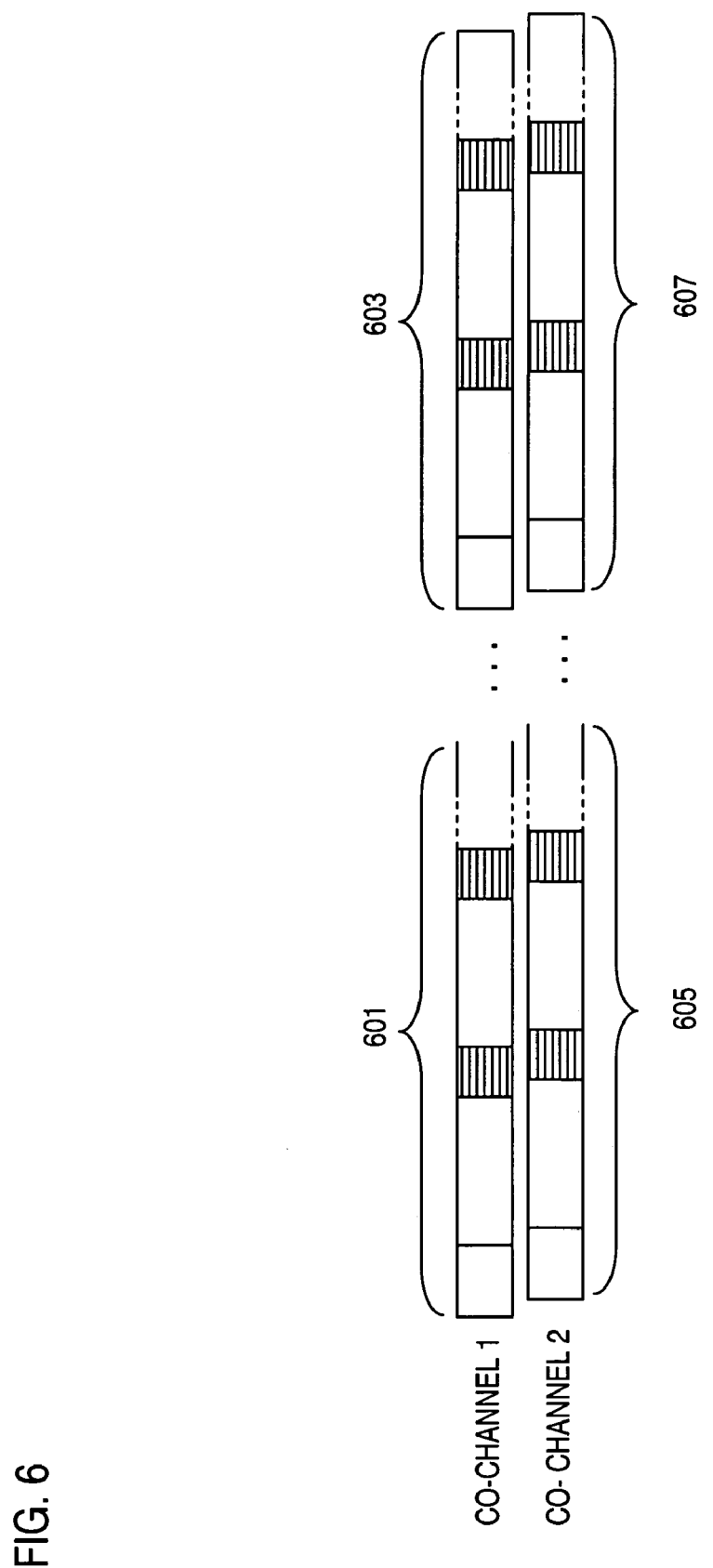
FIG. 6 is a diagram showing the periodic nature of the cross-correlation between co-channel frames, in accordance with an embodiment of the present invention.

Furthermore, it is important to note that these cross-correlations are periodic in nature; that is, they recur at the frame rate. As shown in FIG. 6, frames 601, 603 associated with co-channel 1 are simply shifted with respect to frames 605, 607 of co-channel 2.

If the co-channels use the same seed and are aligned perfectly (with aligned frame boundaries), then the cross-correlation of their pilot segments yields the following:

$$C_{XY}(0) = A_x A_y e^{j\phi},\qquad \text{Eq. (4)}$$

where, $A_x$ and $A_y$ are the magnitudes of vectors x(k) and y(k), respectively and $\phi$ is the phase difference between the vectors x(k) and y(k). This correlation has the effect of rotating the desired user's signal, thereby causing severe interference.

FIG. 7 is a diagram of an exemplary Gold sequence generator used in the scrambler of FIG. 6. By using different Gold sequences for the co-channels, i.e., different initialization seeds for each of the co-channels, the interference can be mitigated. In this example, a Gold sequence generator 700 employs the preferred polynomials of $1+X^7+X^{18}$ and $1+Y^5+Y^7+Y^{10}+Y^{18}$. Continuing with the example of FIG. 5, to sustain 17 co-channels, in an exemplary embodiment of the present invention, the seeds in Tables 3 and 4 can be programmed into an m-sequence generator 701. The polynomials are initialized as follows: X(0)=1, and X(1)=X(2)= . . . X(17)=0; and Y(0)=Y(1)=X(2)= . . . X(17)=1. The Gold code sequence numbers "n" corresponding to the initialization are also listed in Table 3.

The seeds are generated, according to one embodiment of the present invention, using a sub-optimal search algorithm that minimizes the worst cross-correlation between every pair of the co-channel pilot-segments.

TABLE 3

| Co-channel # | Seed X Decimal | Seed X Hex | Sequence # (n) |
|---|---|---|---|
| 1 | 1 | 00001 | 0 |
| 2 | 42348 | 0A56C | 189063 |
| 3 | 55204 | 0D7A4 | 153751 |
| 4 | 57415 | 0E047 | 238776 |
| 5 | 74129 | 12191 | 62994 |
| 6 | 88022 | 157D6 | 95552 |
| 7 | 111487 | 1B37F | 2553 |
| 8 | 112625 | 1B7F1 | 227369 |
| 9 | 123876 | 1E3E4 | 26392 |
| 10 | 137205 | 217F5 | 214455 |
| 11 | 145515 | 2386B | 51921 |
| 12 | 151841 | 25121 | 208647 |
| 13 | 166238 | 2895E | 27314 |
| 14 | 174767 | 2AAAF | 104754 |
| 15 | 183101 | 2CB3D | 76683 |
| 16 | 186848 | 2D9E0 | 146239 |
| 17 | 188914 | 2E1F2 | 96364 |

TABLE 4

| Co-channel # | Seed X Decimal | Seed X Hex |
|---|---|---|
| 1 | 13 | 0000D |
| 2 | 53 | 00035 |
| 3 | 70 | 00046 |
| 4 | 74 | 0004A |
| 5 | 126 | 0007E |
| 6 | 159 | 0009F |
| 7 | 179 | 000B3 |
| 8 | 216 | 000D8 |
| 9 | 236 | 000EC |
| 10 | 238 | 000EE |
| 11 | 244 | 000F4 |
| 12 | 262 | 00106 |
| 13 | 278 | 00116 |
| 14 | 536 | 00218 |
| 15 | 628 | 00274 |
| 16 | 737 | 002E1 |
| 17 | 771 | 00303 |

The worst case correlations between any two of the listed co-channels of Tables 3 and 4 are given in FIGS. 10 and 11, respectively. The maximum cross-correlation is seen in FIG. 10 to be −2.78 dB (highlighted in bold font). For FIG. 11, this maximum cross-correlation occurs at −2.92 dB. It is observed that, although the Gold sequences themselves have good cross-correlation properties, the pilot-segments can exhibit poor cross-correlation characteristics. This is due to the fact that the segments are only 36-symbols long and the seed-selection procedure is constrained by the worst cross-correlation.

Figure 8:
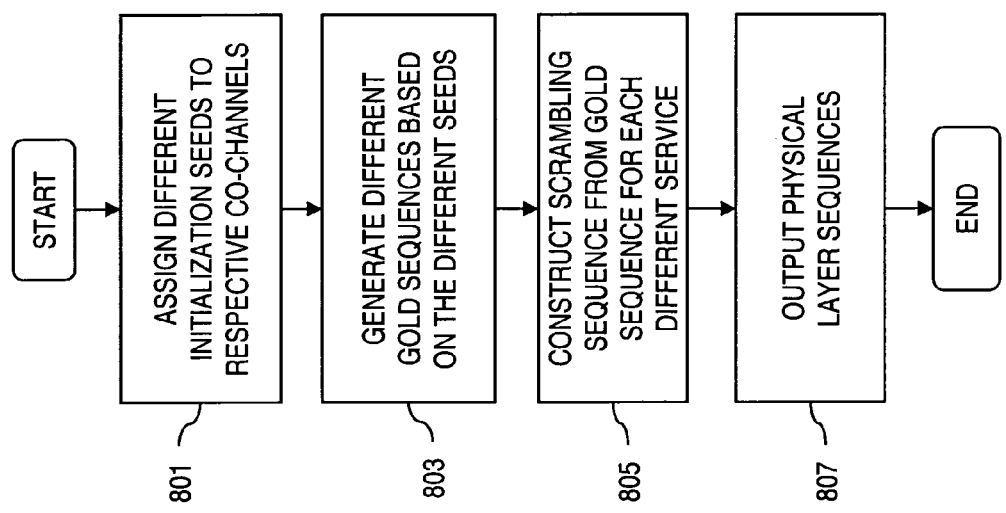
FIG. 8 is a flowchart of a process for generating different physical layer sequences, according to an embodiment of the present invention.
Figure 9:
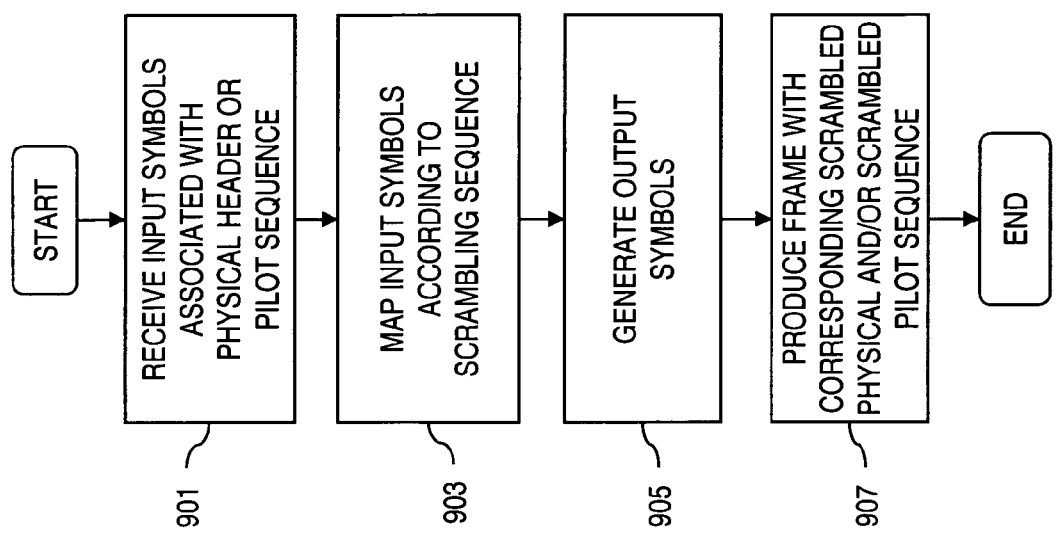
FIG. 9 is a flowchart of process for generating scrambled physical headers, according to an embodiment of the present invention.

The scrambling process is now further explained in FIGS. 8 and 9.

FIG. 8 is a flowchart of a process for generating different physical layer sequences, according to an embodiment of the present invention. In step 801, different initialization seeds are assigned to the respective co-channels. Next, Gold sequences are generated based on the seeds, per step 803. A scrambling sequence is then constructed, as in step 805, from the Gold sequence for each different service. In step 807, the physical layer sequences are output by the scrambler 209 (FIG. 2).

FIG. 9 is a flowchart of process for generating scrambled physical headers, according to an embodiment of the present invention. The transmitter 200 (of FIG. 2) receives input symbols associated with the physical header or pilot sequence, as in step 901. In step 903, the transmitter maps the input symbols according to a scrambling sequence generated by the scrambler 209. The output symbols are then generated, per step 905. Thereafter, the transmitter outputs a frame with a scrambled physical and/or scrambled pilot sequence (step 907).

Figure 12:
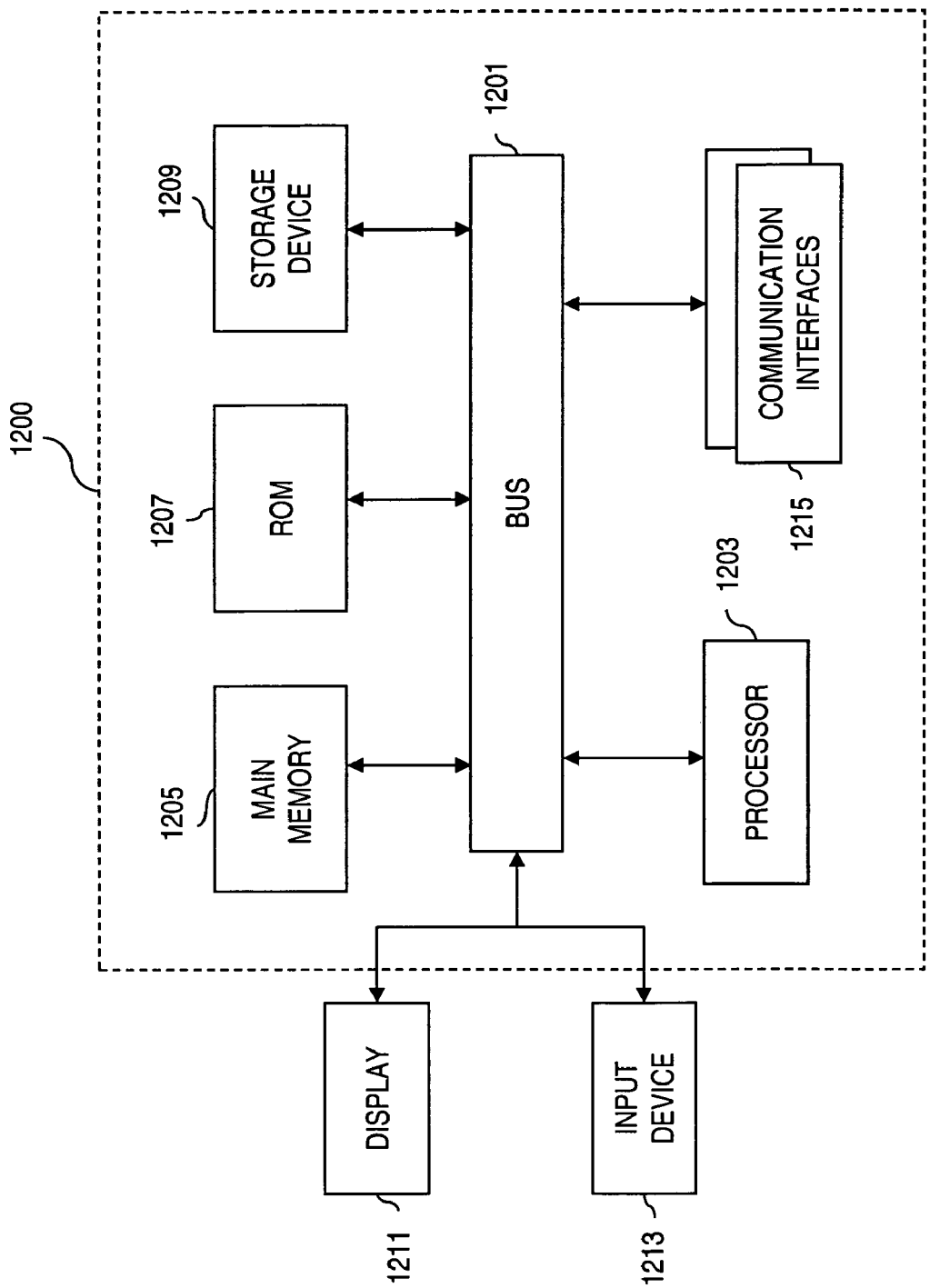
FIG. 12 is a diagram of a hardware platform that can perform the various processes for isolating co-channel interference, in accordance with embodiments of the present invention.

FIG. 12 illustrates exemplary hardware upon which an embodiment according to the present invention can be implemented. A computing system 1200 includes a bus 1201 or other communication mechanism for communicating information and a processor 1203 coupled to the bus 1201 for processing information. The computing system 1200 also includes main memory 1205, such as a random access memory (RAM) or other dynamic storage device, coupled to the bus 1201 for storing information and instructions to be executed by the processor 1203. Main memory 1205 can also be used for storing temporary variables or other intermediate information during execution of instructions by the processor 1203. The computing system 1200 may further include a read only memory (ROM) 1207 or other static storage device coupled to the bus 1201 for storing static information and instructions for the processor 1203. A storage device 1209, such as a magnetic disk or optical disk, is coupled to the bus 1201 for persistently storing information and instructions.

The computing system 1200 may be coupled via the bus 1201 to a display 1211, such as a liquid crystal display, or an active matrix display, for displaying information to a user. An input device 1213, such as a keyboard including alphanumeric and other keys, may be coupled to the bus 1201 for communicating information and command selections to the processor 1203. The input device 1213 can include a cursor control, such as a mouse, a trackball, or cursor direction keys, for communicating direction information and command selections to the processor 1203 and for controlling cursor movement on the display 1211.

According to one embodiment of the invention, the processes of FIGS. 8 and 9 can be provided by the computing system 1200 in response to the processor 1203 executing an arrangement of instructions contained in main memory 1205. Such instructions can be read into main memory 1205 from another computer-readable medium, such as the storage device 1209. Execution of the arrangement of instructions contained in main memory 1205 causes the processor 1203 to perform the process steps described herein. One or more processors in a multi-processing arrangement may also be employed to execute the instructions contained in main memory 1205. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computing system 1200 also includes at least one communication interface 1215 coupled to bus 1201. The communication interface 1215 provides a two-way data communication coupling to a network link (not shown). The communication interface 1215 sends and receives electrical, electromagnetic, or optical signals that carry digital data streams representing various types of information. Further, the communication interface 1215 can include peripheral interface devices, such as a Universal Serial Bus (USB) interface, a PCMCIA (Personal Computer Memory Card International Association) interface, etc.

The processor 1203 may execute code that is being received over the communication interface 1215 and/or store the code in the storage device 1209, or other non-volatile storage for later execution. In this manner, the computing system 1200 may obtain application code in the form of a carrier wave.

The term "computer-readable medium" as used herein refers to any medium that participates in providing instructions to the processor 1203 for execution. Such a medium may take many forms, including but not limited to non-volatile media, volatile media, and transmission media. Non-volatile media include, for example, optical or magnetic disks, such as the storage device 1209. Volatile media include dynamic memory, such as main memory 1205. Transmission media include coaxial cables, copper wire and fiber optics, including the wires that comprise the bus 1201. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and an EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Accordingly, the various embodiments of the present invention provide an approach for minimizing co-channel interference in a digital broadcast and interactive system. It is recognized that the cross-correlations between co-channel frames are periodic in nature. Each of these frames includes a header and a pilot sequence for synchronization of carrier phase and carrier frequency. Non-header portions of the frames are scrambled according to respective different scrambling sequences to minimize interference between the co-channels. According to one embodiment of the present invention, different initialization seeds are supplied to a Gold sequence generator for each of the co-channels to produce the different scrambling sequences. The above arrangement advantageously reduces the impact of co-channel interference, thereby enhancing receiver performance.

While the present invention has been described in connection with a number of embodiments and implementations, the present invention is not so limited but covers various obvious modifications and equivalent arrangements, which fall within the purview of the appended claims.

What is claimed is:

1. A method for minimizing co-channel interference in a communication system, the method comprising the steps of:
assigning a first scrambling sequence with a scrambler at a transmission station in the communications system, associated with a header or a pilot sequence of a first frame, to a first co-channel; and
assigning a second scrambling sequence with the scrambler at the transmission station in the communications system, associated with a header or a pilot sequence of a second frame, to a second co-channel that is adjacent to the first co-channel, wherein the scrambling sequences are based on Gold sequences with correspondingly different seeds, and the co-channels are among 17 co-channels, the seeds corresponding to the 17 co-channels are specified by Table A or Table B:

TABLE A

| Co-channel # | Seed X | |
|---|---|---|
| | Decimal | Hex |
| 1 | 1 | 00001 |
| 2 | 42348 | 0A56C |
| 3 | 55204 | 0D7A4 |
| 4 | 57415 | 0E047 |
| 5 | 74129 | 12191 |
| 6 | 88022 | 157D6 |
| 7 | 111487 | 1B37F |
| 8 | 112625 | 1B7F1 |
| 9 | 123876 | 1E3E4 |
| 10 | 137205 | 217F5 |
| 11 | 145515 | 2386B |
| 12 | 151841 | 25121 |
| 13 | 166238 | 2895E |
| 14 | 174767 | 2AAAF |
| 15 | 183101 | 2CB3D |
| 16 | 186848 | 2D9E0 |
| 17 | 188914 | 2E1F2 |

TABLE B

| Co-channel # | Seed X Decimal | Seed X Hex |
|---|---|---|
| 1 | 13 | 0000D |
| 2 | 53 | 00035 |
| 3 | 70 | 00046 |
| 4 | 74 | 0004A |
| 5 | 126 | 0007E |
| 6 | 159 | 0009F |
| 7 | 179 | 000B3 |
| 8 | 216 | 000D8 |
| 9 | 236 | 000EC |
| 10 | 238 | 000EE |
| 11 | 244 | 000F4 |
| 12 | 262 | 00106 |
| 13 | 278 | 00116 |
| 14 | 536 | 00218 |
| 15 | 628 | 00274 |
| 16 | 737 | 002E1 |
| 17 | 771 | 00303 | wherein non-header portions of the frames are scrambled according to the respective different scrambling sequences.

2. A method according to claim 1, further comprising the step of:
   determining the seeds to minimize a worst cross-correlation condition.

3. A method according to claim 1, wherein the communication system includes a satellite supporting digital broadcast and interactive applications.

4. A method according to claim 1, wherein the header or the pilot sequence is used for acquiring or tracking carrier phase and carrier frequency.

5. A method according to claim 1, wherein the header and the pilot sequence is used for acquiring or tracking carrier phase and carrier frequency.

6. A method according to claim 1, further comprising the step of:
   transmitting the frame according to a modulation scheme including Binary Phase Shift Keying (BPSK), Quadrature Phase Shift Keying (QPSK), 8PSK, 16 Amplitude Phase Shift Keying (APSK), 32APSK, or a high order Quadrature Amplitude Modulation (QAM).

7. A method according to claim 1, further comprising the step of:
   modulating the frames according to different modulation schemes.

8. A method according to claim 1, wherein each of the frames includes information encoded according to Low Density Parity Check (LDPC) coding.

9. An apparatus for minimizing co-channel interference in a communication system, comprising:
   a scrambler configured to assign a first scrambling sequence, associated with a header or a pilot sequence of a first frame, to a first co-channel,
   wherein the scrambler assigns a second scrambling sequence, associated with a header or a pilot sequence of a second frame, to a second co-channel that is adjacent to the first co-channel, wherein the scrambling sequences are based on Gold sequences with different seeds and the co-channels are among 17 co-channels, the seeds corresponding to the 17 co-channels are specified by Table A or Table B:

TABLE A

| Co-channel # | Seed X Decimal | Seed X Hex |
|---|---|---|
| 1 | 1 | 00001 |
| 2 | 42348 | 0A56C |
| 3 | 55204 | 0D7A4 |
| 4 | 57415 | 0E047 |
| 5 | 74129 | 12191 |
| 6 | 88022 | 157D6 |
| 7 | 111487 | 1B37F |
| 8 | 112625 | 1B7F1 |
| 9 | 123876 | 1E3E4 |
| 10 | 137205 | 217F5 |
| 11 | 145515 | 2386B |
| 12 | 151841 | 25121 |
| 13 | 166238 | 2895E |
| 14 | 174767 | 2AAAF |
| 15 | 183101 | 2CB3D |
| 16 | 186848 | 2D9E0 |
| 17 | 188914 | 2E1F2 |

TABLE B

| Co-channel # | Seed X Decimal | Seed X Hex |
|---|---|---|
| 1 | 13 | 0000D |
| 2 | 53 | 00035 |
| 3 | 70 | 00046 |
| 4 | 74 | 0004A |
| 5 | 126 | 0007E |
| 6 | 159 | 0009F |
| 7 | 179 | 000B3 |
| 8 | 216 | 000D8 |
| 9 | 236 | 000EC |
| 10 | 238 | 000EE |
| 11 | 244 | 000F4 |
| 12 | 262 | 00106 |
| 13 | 278 | 00116 |
| 14 | 536 | 00218 |
| 15 | 628 | 00274 |
| 16 | 737 | 002E1 |
| 17 | 771 | 00303 | wherein non-header portions of the frames are scrambled according to the respective scrambling sequences.

10. An apparatus according to claim 9, further comprising:
    means for determining the seeds to minimize a worst cross-correlation condition.

11. An apparatus according to claim 9, wherein the communication system includes a satellite supporting digital broadcast and interactive applications.

12. An apparatus according to claim 9, wherein the header or the pilot sequence is used for acquiring or tracking carrier phase and carrier frequency.

13. An apparatus according to claim 9, wherein the header and the pilot sequence is used for acquiring or tracking carrier phase and carrier frequency.

14. An apparatus according to claim 9, further comprising:
    a transmitter configured to transmit the frame according to a modulation scheme including Binary Phase Shift Keying (BPSK), Quadrature Phase Shift Keying (QPSK), 8PSK, 16 Amplitude Phase Shift Keying (APSK), 32APSK, or a high order Quadrature Amplitude Modulation (QAM).

15. An apparatus according to claim 9, further comprising:
    a modulator configured to modulate the frames according to different modulation schemes.

16. An apparatus according to claim 9, wherein each of the frames includes information encoded according to Low Density Parity Check (LDPC) coding.

17. A method for communicating in a radio communication system, the method comprising the steps of:
transmitting, from a transmitter in the radio communication system, a plurality of frames over different communication channels established over the radio communication system, the communication channels being adjacent co-channels,
wherein each of the frames includes a header and a pilot sequence for synchronization of carrier phase and carrier frequency, and non-header portions of the frames are scrambled with a scrambler in the radio communication system according to respective different scrambling sequences, wherein the scrambling sequences are based on Gold sequences with different seeds and the co-channels are among 17 co-channels, the seeds corresponding to the 17 co-channels are specified by Table A or Table B:

TABLE A

| Co-channel # | Seed X Decimal | Hex |
|---|---|---|
| 1 | 1 | 00001 |
| 2 | 42348 | 0A56C |
| 3 | 55204 | 0D7A4 |
| 4 | 57415 | 0E047 |
| 5 | 74129 | 12191 |
| 6 | 88022 | 157D6 |
| 7 | 111487 | 1B37F |
| 8 | 112625 | 1B7F1 |
| 9 | 123876 | 1E3E4 |
| 10 | 137205 | 217F5 |
| 11 | 145515 | 2386B |
| 12 | 151841 | 25121 |
| 13 | 166238 | 2895E |
| 14 | 174767 | 2AAAF |
| 15 | 183101 | 2CB3D |
| 16 | 186848 | 2D9E0 |
| 17 | 188914 | 2E1F2 |

TABLE B

| Co-channel # | Seed X Decimal | Hex |
|---|---|---|
| 1 | 13 | 0000D |
| 2 | 53 | 00035 |
| 3 | 70 | 00046 |
| 4 | 74 | 0004A |
| 5 | 126 | 0007E |
| 6 | 159 | 0009F |
| 7 | 179 | 000B3 |
| 8 | 216 | 000D8 |
| 9 | 236 | 000EC |
| 10 | 238 | 000EE |
| 11 | 244 | 000F4 |
| 12 | 262 | 00106 |
| 13 | 278 | 00116 |
| 14 | 536 | 00218 |
| 15 | 628 | 00274 |
| 16 | 737 | 002E1 |
| 17 | 771 | 00303 | to minimize interference between the co-channels.

18. A method according to claim 17, wherein each of the frames has a structure according to a Digital Video Broadcast (DVB) standard.

19. An apparatus for communicating in a radio communication system, comprising:
a transmitter configured to transmit a plurality of frames over different communication channels established over the radio communication system, wherein the communication channels are adjacent co-channels,
wherein each of the frames includes a header and a pilot sequence for synchronization of carrier phase and carrier frequency, and non-header portions of the frames are scrambled according to respective different scrambling sequences, wherein the scrambling sequences are based on Gold sequences with different seeds and the co-channels are among 17 co-channels, the seeds corresponding to the 17 co-channels are specified by Table A or Table B:

TABLE A

| Co-channel # | Seed X Decimal | Hex |
|---|---|---|
| 1 | 1 | 00001 |
| 2 | 42348 | 0A56C |
| 3 | 55204 | 0D7A4 |
| 4 | 57415 | 0E047 |
| 5 | 74129 | 12191 |
| 6 | 88022 | 157D6 |
| 7 | 111487 | 1B37F |
| 8 | 112625 | 1B7F1 |
| 9 | 123876 | 1E3E4 |
| 10 | 137205 | 217F5 |
| 11 | 145515 | 2386B |
| 12 | 151841 | 25121 |
| 13 | 166238 | 2895E |
| 14 | 174767 | 2AAAF |
| 15 | 183101 | 2CB3D |
| 16 | 186848 | 2D9E0 |
| 17 | 188914 | 2E1F2 |

TABLE B

| Co-channel # | Seed X Decimal | Hex |
|---|---|---|
| 1 | 13 | 0000D |
| 2 | 53 | 00035 |
| 3 | 70 | 00046 |
| 4 | 74 | 0004A |
| 5 | 126 | 0007E |
| 6 | 159 | 0009F |
| 7 | 179 | 000B3 |
| 8 | 216 | 000D8 |
| 9 | 236 | 000EC |
| 10 | 238 | 000EE |
| 11 | 244 | 000F4 |
| 12 | 262 | 00106 |
| 13 | 278 | 00116 |
| 14 | 536 | 00218 |
| 15 | 628 | 00274 |
| 16 | 737 | 002E1 |
| 17 | 771 | 00303 | to minimize interference between the co-channels.

20. An apparatus according to claim 19, wherein each of the frames has a structure according to a Digital Video Broadcast (DVB) standard.

21. A method for communicating in a radio communication system, the method comprising the steps of:
receiving, at a receiver, a plurality of frames over different communication channels established over the radio communication system, the communication channels being adjacent co-channels,
wherein each of the frames includes a header and a pilot sequence for synchronization of carrier phase and carrier frequency, and non-header portions of the frames are scrambled according to respective different scrambling sequences, wherein the scrambling sequences are based on Gold sequences with different seeds and the co-channels are among 17 co-channels, the seeds corresponding to the 17 co-channels are specified by Table A or Table B:

TABLE A

| Co-channel # | Seed X Decimal | Hex |
| --- | --- | --- |
| 1 | 1 | 00001 |
| 2 | 42348 | 0A56C |
| 3 | 55204 | 0D7A4 |
| 4 | 57415 | 0E047 |
| 5 | 74129 | 12191 |
| 6 | 88022 | 157D6 |
| 7 | 111487 | 1B37F |
| 8 | 112625 | 1B7F1 |
| 9 | 123876 | 1E3E4 |
| 10 | 137205 | 217F5 |
| 11 | 145515 | 2386B |
| 12 | 151841 | 25121 |
| 13 | 166238 | 2895E |
| 14 | 174767 | 2AAAF |
| 15 | 183101 | 2CB3D |
| 16 | 186848 | 2D9E0 |
| 17 | 188914 | 2E1F2 |

TABLE B

| Co-channel # | Seed X Decimal | Hex |
| --- | --- | --- |
| 1 | 13 | 0000D |
| 2 | 53 | 00035 |
| 3 | 70 | 00046 |
| 4 | 74 | 0004A |
| 5 | 126 | 0007E |
| 6 | 159 | 0009F |
| 7 | 179 | 000B3 |
| 8 | 216 | 000D8 |
| 9 | 236 | 000EC |
| 10 | 238 | 000EE |
| 11 | 244 | 000F4 |
| 12 | 262 | 00106 |
| 13 | 278 | 00116 |
| 14 | 536 | 00218 |
| 15 | 628 | 00274 |
| 16 | 737 | 002E1 |
| 17 | 771 | 00303 | to minimize interference between the co-channels.

22. A method according to claim 21, wherein each of the frames has a structure according to a Digital Video Broadcast (DVB) standard.

23. An apparatus for communicating in a radio communication system, comprising:
a receiver configured to receive a plurality of frames over different communication channels established over the radio communication system, wherein the communication channels are adjacent co-channels,
wherein each of the frames includes a header and a pilot sequence for synchronization of carrier phase and carrier frequency, and non-header portions of the frames are scrambled according to respective different scrambling sequences, wherein the scrambling sequences are based on Gold sequences with different seeds and the co-channels are among 17 co-channels, the seeds corresponding to the 17 co-channels are specified by Table A or Table B:

TABLE A

| Co-channel # | Seed X Decimal | Hex |
| --- | --- | --- |
| 1 | 1 | 00001 |
| 2 | 42348 | 0A56C |
| 3 | 55204 | 0D7A4 |
| 4 | 57415 | 0E047 |
| 5 | 74129 | 12191 |
| 6 | 88022 | 157D6 |
| 7 | 111487 | 1B37F |
| 8 | 112625 | 1B7F1 |
| 9 | 123876 | 1E3E4 |
| 10 | 137205 | 217F5 |
| 11 | 145515 | 2386B |
| 12 | 151841 | 25121 |
| 13 | 166238 | 2895E |
| 14 | 174767 | 2AAAF |
| 15 | 183101 | 2CB3D |
| 16 | 186848 | 2D9E0 |
| 17 | 188914 | 2E1F2 |

TABLE B

| Co-channel # | Seed X Decimal | Hex |
| --- | --- | --- |
| 1 | 13 | 0000D |
| 2 | 53 | 00035 |
| 3 | 70 | 00046 |
| 4 | 74 | 0004A |
| 5 | 126 | 0007E |
| 6 | 159 | 0009F |
| 7 | 179 | 000B3 |
| 8 | 216 | 000D8 |
| 9 | 236 | 000EC |
| 10 | 238 | 000EE |
| 11 | 244 | 000F4 |
| 12 | 262 | 00106 |
| 13 | 278 | 00116 |
| 14 | 536 | 00218 |
| 15 | 628 | 00274 |
| 16 | 737 | 002E1 |
| 17 | 771 | 00303 | to minimize interference between the co-channels.

24. An apparatus according to claim 23, wherein each of the frames has a structure according to a Digital Video Broadcast (DVB) standard.

* * * * *